UNITED STATES PATENT OFFICE.

SIDNEY G. THOMAS, OF 3 QUEEN'S ROAD VILLAS, COUNTY OF SURREY, ENGLAND.

IMPROVEMENT IN MANUFACTURE OF REFRACTORY BASIC BRICKS AND FURNACE-LININGS.

Specification forming part of Letters Patent No. 218,334, dated August 5, 1879; application filed February 13, 1879; patented in England, March 6, 1878.

*To all whom it may concern:*

Be it known that I, SIDNEY GILCHRIST THOMAS, of 3 Queen's Road Villas, in the county of Surrey, England, have invented a new and useful process for Improvements in the Manufacture of Refractory Basic Bricks and Furnace-Linings, which process is fully set forth in the following specification.

These improvements relate to the manufacture of a highly basic, hard, and refractory lining for furnaces employed in the manufacture of steel and ingot iron, especially for Bessemer converters and for the hearths of open-hearth steel-furnaces, such as the Siemens, Ponsard, and Pernot furnaces, these linings permitting of the formation of highly-basic slags, in which phosphorus can be removed.

These linings are made as follows: I find that alumina and silica when intimately mixed with limestone (particularly the magnesian limestones) in certain proportions give it, after it has been exposed for a sufficient period to an intense white heat, sufficient strength and cohesiveness to form an excellent basic lining material. The silica and alumina necessary for this purpose may be either present naturally, which is preferable, or be introduced artificially, as in the form of clay or aluminous shale, or even as aluminous blast-furnace slag.

The substance which I find by far the most advantageous to use is a highly-magnesian limestone (the more magnesian the better) containing naturally sufficient silica and alumina to produce, when fired at an excessively high temperature, a strong coherent refractory substance. Thus a highly-magnesian limestone containing about seven per cent. of silica, four per cent. of alumina, and two per cent. of oxide of iron is a suitable one. If this description of magnesian limestone is not readily available a purer magnesian limestone may be used after having been ground up with a very aluminous limestone, (this being preferably also magnesian,) so as to give a composition as regards alumina and silica approximating to that quoted; or a material of similar composition may be obtained by grinding a comparatively pure magnesian limestone with clay or with aluminous shale. Great care should be taken to mix the clay or shale thoroughly with the limestone, so that it is equally diffused through the whole mass. This is absolutely necessary to obtain a successful result.

Aluminous non-magnesian limestone is in all cases inferior to magnesian limestone for my purpose; but when the lining can be always kept perfectly dry and magnesian stone is not available it may be used.

A small quantity of magnesia may often be mixed with the magnesian-limestone materials before mentioned with advantage when the mixture is low in magnesia. From three to four and a half per cent. of alumina, from five to eight or nine per cent. of silica, and from one to two per cent. of oxide of iron may be taken generally to represent the limits for the most favorable proportions of binding material for a good lining before calcination. As a general rule the more alumina there is present, so long as the refractory character of the mixture is unimpaired, the better; but if much oxide of iron is present there should be comparatively little alumina, and vice versa, as oxide of iron is very apt to cause fusibility, particularly in presence of alumina.

Though silica is a most excellent binding material, there are limits beyond which its presence becomes injurious. Thus the total silica present in the uncalcined material should never exceed about ten per cent. as a maximum, nor should it materially exceed twice the total alumina and oxide of iron present.

As the composition of magnesian limestone is very variable, and a small excess of alumina or oxide of iron will greatly affect the character of the material, it is best in all cases, when new materials are used of which the composition is not accurately known, to prepare trial bricks approximately of the desired composition, and to expose them after drying to a full white heat for at least thirty-six hours. If they fuse the proportion of alumina or oxide of iron is too high. If they are tender after removal, or soon become so on exposure to the air, the amount of binding material is too small. If, however, a compact hard brick is formed, the composition may be generally considered as satisfactory.

The purer varieties of limestone by themselves cannot be successfully used for basic linings, the presence of a minimum of about five or six per cent. of silica and alumina being essential to form a good material.

To make basic bricks, which is the form in which the materials above described should be used for lining the Bessemer converter, I proceed as follows: The material is finely ground and moistened (clay-water may be used to promote its coherence) and molded into bricks under considerable pressure. The bricks are dried slowly, and then fired for a considerable period at a very intense white heat. When fired at ordinary kiln-temperatures the bricks are soft and disintegrate on exposure to the air. The temperature in the kiln must be high enough, and continued for a sufficient period, to cause the whole of the alumina and silica present to enter into combination with the lime and magnesia. The kiln must be lined with good silica bricks, or it will not stand the intense heat necessary. It should be one with a down draft, and may be either fired by a regenerative gas-furnace, which is preferable, or be provided with an extra number and area of fire-places. When the flue-openings are in the floor of the kiln the floor should be entirely formed of my basic bricks; or, if these are not obtainable at the first building of the kiln, the silica bricks composing it may be covered with a layer of plumbago blocks, (which may be advantageously coated with a cream of lime and a little clay,) or with a mixture of refractory talc and plumbago, the whole being covered with a layer of magnesian lime, or of magnesian-limestone blocks, on which the bricks are stacked. Care should be taken that at no part exposed to the full heat of the kiln is the silica lining in contact with the basic bricks.

The kiln, after being fired for some time at a red heat, must be kept at a very intense white heat for a period averaging from forty-eight to seventy-two hours, according to the construction and size of the kiln, until combination has taken place through the whole substance of the bricks and a hard homogeneous structure has been formed.

The cooling must be very slow, moderate firing being kept up for some time while the kiln is cooling, in order to let down the heat gradually. There should be no more heat than necessary, especial care being taken to prevent any currents of cold air striking the bricks while in the kiln, or they will crack badly. The shrinkage in the kiln will not generally be less than twenty per cent. The bricks may in consequence be set very closely, though not absolutely touching, as there is a slight expansion as the heat rises, and the upper layers should be the first fired. The bricks should not generally be stacked to a greater height than five feet.

Among the best sizes of brick are those which in the raw do not exceed twelve by twelve by six inches, and are not smaller than six by five by four inches. Very large sizes and those of very unequal dimensions burn badly. Approximately square shapes burn well.

As an example, I may quote the composition of an excellent brick made from a limestone containing nearly equal amounts of carbonate of lime and carbonate of magnesia, which contained after firing six and one-half ($6\frac{1}{2}$) per cent. of alumina, thirteen (13) per cent. of silica, and three and one-half ($3\frac{1}{2}$) per cent. of oxide of iron, with seventy-seven (77) per cent. of lime and magnesia together.

A good brick should generally contain, after firing, from seventy-five to eighty-seven per cent. of lime and magnesia together—at least twenty-five per cent. consisting of magnesia.

The bricks should be used as soon as conveniently may be after they are made, and should always be kept as dry as possible, both before and during use.

When a limestone possessing without admixture the proper composition, as already specified, is obtainable, dressed blocks of it of similar dimensions to those recommended for bricks may be used instead of bricks after being fired in exactly the same way and with the same precautions as if they had been ground and made into bricks previously.

Bessemer tuyeres may be formed of the same material as bricks and fired in the same way.

On account of the shrinkage it is desirable that the blast-holes should be few in number and of large diameter. The tuyeres should also be of considerable diameter in proportion to their length to lessen the effect of this shrinkage.

The bottoms of Bessemer converters may be partly formed of my basic bricks and partly rammed with the same material as that from which the bricks are formed, highly fired, and ground to powder, or with bricks ground to powder.

In applying my linings to the Siemens, Martin, Ponsard, Pernot, and similar furnaces I line the hearth with the material herein described, either in the form of the very highly-fired bricks already described, (which I prefer,) or as a rammed lining. When it is put in as a rammed lining the ground uncalcined material is used. It is essential that the flame should be allowed to play on the hearth before the charge is introduced for a sufficient time to cause the formation of the hard structure and the silicates and aluminates of lime and magnesia, which are a characteristic of my bricks.

If the hearth is put in in layers, as is generally done with a sand bottom, the flame should be allowed to play for a considerable time on each layer, so as to develop this structure throughout.

The sides and roof of open-hearth furnaces may be lined either with my basic bricks or with silica bricks, as is now generally done. When silica bricks are used care must, of course, be taken to separate them from the basic hearth by a layer of some neutral refractory material, such as best plumbago bricks or a very refractory silicate of magnesia.

When the hearth of an open-hearth furnace is lined with a basic material it is very useful, both for convenience of repair and as rendering any provision for this junction unnecessary, to have the hearth of the furnace mounted on a carriage, so that it may be readily removed for repairs, as has been often proposed, and as is actually done in the Ponsard and Pernot furnaces when there is no actual contact between the roof and the hearth. It is to be understood that these basic linings are to be used in conjunction with my system of working with a highly-basic slag (for which I am applying for Letters Patent) for effecting the removal of phosphorus.

Having thus described the nature of my invention and the manner of performing the same, I would have it understood that it has before been proposed to employ as the lining of a Bessemer converter and reverberatory furnaces limestone or lime containing as little silica as possible, with or without a little oxide of iron, and that it has been proposed to use this material as bricks, either burnt or unburnt, (presumably at the temperature at which clay or fire-clay bricks are commonly burned.) To this, therefore, (which in my experience is not practically successful, as I find the presence of a considerable amount of silica and alumina and the firing at an excessively high heat essential to success,) I make no claim; but

What I claim is—

1. The manufacture and use of refractory basic bricks, blocks, and tuyeres for lining steel and iron furnaces formed of the natural or artificial mixtures hereinbefore described, such bricks, blocks, and tuyeres being fired at a very intense and prolonged heat, substantially as and for the purposes set forth.

2. The lining of hearths of open-hearth or similar steel-furnaces by ramming into them the basic materials hereinbefore described, and then firing such lining at a very intense and prolonged heat, substantially as and for the purposes set forth.

Witness my hand this 20th day of January, 1879.

SIDNEY GILCHRIST THOMAS.

Witnesses:
PHILIP M. JUSTICE,
ALLEN P. JONES.